United States Patent Office 3,021,277
Patented Feb. 13, 1962

3,021,277
OIL BASE DRILLING AND FRACTURING FLUID
Raymond W. Hoeppel, P.O. Box 5, Oak View, Calif.
No Drawing. Filed Dec. 23, 1957, Ser. No. 704,314
6 Claims. (Cl. 252—8.5)

This invention relates to oil base fluids or water-in-oil emulsions for use in well drilling and in fracturing producing horizons to promote oil production.

More specifically, it relates to a new composition and method of improving the suspending power, emulsifying power, and fluid loss of oil base or emulsion fluids containing polyvalent metal soaps of fatty acids without raising the viscosity or initial gel strength to a point which would retard settling of drilled solids that are desired to be removed from the fluids. Other advantages from the new composition and method of the present invention also are obtained and will be pointed out as the specification proceeds.

In the drilling of wells it is desirable to use a low viscosity fluid in order to reduce pump pressures, increase the drilling rate, increase the settling rate of drilled cuttings, facilitate the screening of larger cuttings from the fluid, and facilitate the handling and storage of the fluid. Such low viscosity fluids are advantageously employed in drilling with the newly developed turbo or impact drills, in which the driving power for the drill is hydraulically transmitted by the drilling fluid from the pumps at the surface to a subterranean engine.

Oil base or emulsion fluids normally are not very thixotropic and consequently will not adequately support finely divided weight material, such as barites, if the viscosity is reduced to a desired low value. The weight material settles in two manners in such fluids, resulting in top settling, or the appearance of a synerized oil layer at the top of the column, and in bottom settling, wherein the weight material actually settles to the bottom in a mass which may be difficult to redisperse without violent agitation.

Bottom settling occurring in the bore hole may result in stuck drill pipe. Both types of settling are troublesome in surface pits or in storage tanks as frequent agitation is required to assure a homogeneous slurry. Such agitation entrains undesired drilled cuttings that tend to become dispersed in the fluid, raising its viscosity and specific gravity.

The ideal oil base fluid should be characterized by a low viscosity and yet adequately support finely divided weight material and still permit the settling out of drilled cuttings and sand encountered by the drill. Experimentation has shown that such an ideal fluid should have a zero initial gel strength to assure settling out of cuttings and sand and a finite 10 minute gel strength to aid in the suspension of the finely divided weight material. This type of thixotropy also is desirable in fracturing operations to aid in slowing down the settling rate of solids that might be added as propping agents for opened fissures.

Low viscosity oil base fluids containing polyvalent metal soaps of fatty acids, such as are described in my co-pending application, Serial No. 603,792, filed August 13, 1956, now U.S. Patent No. 2,965,566, often have undesirable high fluid losses and may not adequately support weight material unless the viscosity is maintained above a certain minimum. Such fluids have low 10 minute gel strengths and develop severe syneresis (top settling) and appreciable bottom settling on long standing. When the viscosity is raised sufficiently to prevent bottom settling, syneresis often persists, and also the initial gel strength may become finite, resulting in fluid characteristics that tend to prevent the settling out of drilled solids. As these solids build up, the fluid becomes progressively more viscous and the initial gel strength further increases, thus aggravating the situation. If the initial gel strength can be maintained at zero, drilled sands and cuttings readily settle out in the mud ditches and shaker pit, and the fluid maintains its low viscosity.

Water-in-oil emulsions containing soaps of fatty acids usually will adequately support weight material, if the water content is not too high so as to wet the solids, but these emulsions are often subject to syneresis (top settling) and suffer the other aforementioned disadvantages, namely, a finite initial gel strength and high fluid loss. In addition, such emulsions are oftentimes "loose," as is evidenced by the presence of free water in the filtrate from the fluid loss test. Such loose emulsions tend to water-wet sand or clay particles in a production zone and thus lower the permeability of the horizon to oil.

The emulsion may be "tightened" appreciably by the addition of high molecular weight amines as is described in my co-pending application, Serial No. 677,850, dated August 13, 1957, but the problems of a finite initial gel strength and a somewhat elevated fluid loss are still not resolved.

In fracturing fluids a low fluid loss is desirable in order to prevent premature loss of the fluid into the upper side strata and to thus maintain a high pressure at a lower zone which is to be fractured. If the fracturing fluid contains water, it is desirable to have this water tightly emulsified so that it will not water-wet a production zone and lower its permeability to oil.

With the above problems in mind, an object of this invention is to provide a composition for and method of reducing to zero, or approximately so, the initial gel strength of oil base fluids and water-in-oil emulsions containing polyvalent metal soaps of fatty acids without lowering their ability to suspend finely divided weight material such as barites.

Another object is to provide a composition for and method of improving the weight suspending properties of oil base fluids containing polyvalent metal soaps of fatty acids and to also reduce syneresis of such fluids without appreciably raising their viscosity.

A still further object is to provide a composition for and method of reducing the fluid loss of oil base and water-in-oil emulsion fluids containing polyvalent metal fatty acid soaps.

Another object is to provide a composition for and method of tightening water-in-oil emulsions containing polyvalent metal fatty acid soaps so that little or no free water is present in the filtrate and so that the fluid will not water-wet solids encountered in drilling.

Additional objects of the invention will appear to those skilled in the art from the following description.

These and other objects and advantages of my invention, which will be evident to those skilled in the art as the specification proceeds are generally attained by providing a composition and method of forming a combination of an oil, an aqueous phase, a polyvalent metal soap of a monocarboxylic fatty acid, a polyvalent metal soap of a polymerized polycarboxylic fatty acid, and an alkaline earth base.

Experiments have proven that the addition of the polymerized fatty acid soap lessens the tendency of weight material to settle from the oil base or emulsion fluid, reduces syneresis, reduces initial gel strength, reduces fluid loss, tightens the emulsion, and often improves the thixotropy without otherwise materially altering the other desired properties of the fluid.

Any type of oil may be used but in the interest of low viscosity and cleanliness it is preferred to use refined petroleum oils such as diesel fuel, gas oil, stove oil and the like.

The aqueous phase must be present in an amount of at least 0.5 percent and may in some instances be present in amounts as high as 70 percent. Where a large amount of an aqueous phase is present, the addition of a high molecular weight amine is recommended to tighten the emulsion, reduce fluid loss and improve the rheological characteristics of the emulsion, as is specified in my co-pending application, Serial No. 677,850, dated August 13, 1957. The amine normally need not be added unless the water content exceeds 35 to 40 percent. The aqueous phase may be pure water, but preferably it should contain an electrolyte such as sodium or calcium chloride.

The monocarboxylic fatty acid used in forming the polyvalent metal soap should contain at least twelve carbon atoms, and preferably sixteen or more carbon atoms, and should be present in an amount varying between 0.2 to 5 percent or more depending upon the desired thixotropy, viscosity or fluid loss, the type of soap or oil used, and the amount of water or solids present. In preparing the soap, saturated fatty acids may be used, but unsaturated fatty acids such as oleic, linoleic or linolenic acids are more desirable in order to facilitate production of a low fluid loss. Rosin acids also, such as in tall oil derivatives, may be added for thinning and fluid loss purposes.

The polymerized polycarboxylic fatty acids used in preparing the second soap must contain two or more carboxyl groups and must contain twenty-four or more carbon atoms. Satisfactory acids of this type include the dimer and trimer acids produced by heat polymerization of unsaturated fatty acids according to a process set forth by Goebel in United States Patent No. 2,482,761, the product being sold under the name of "Empols" or polymerized fatty acids by Emery Industries, Inc., of Cincinnati, Ohio. Other usable sources of these acids are impure by-product residues from processes wherein unsaturated fatty acids are subjected to high temperatures, such as during distillation purification. The amount of polymerized fatty acid soap may vary from 0.05 to 1.5 percent, depending upon the desired thixotropy and viscosity. In general, the polyerized fatty acid soap is present in less than one-third the amount of the monocarboxylic acid soap, and may be present in a ratio as low as one part of polymerized acid soap to 40 parts of monocarboxylic acid soap.

The polyvalent metal soaps of either the monocarboxylic or polycarboxylic fatty acids may be prepared from aqueous solutions of alkali metal soaps of these acids by the addition of water soluble salts of polyvalent metals, such as calcium, iron or zinc chlorides, or they may be prepared by reacting the fatty acids with soluble polyvalent metal oxides or hydroxides. Among the polyvalent metal soaps that are useful calcium, magnesium, iron, aluminum, zinc and manganese soaps.

In the interest of economy, and to accelerate dispersion of the soap, it is preferred to prepare the soaps in the oil base fluid by addition of the fatty acids, at least 0.5 percent water and the polyvalent metal oxide or hydroxide in an amount in excess of that required to react with acids present. Where the oxide or hydroxide is very insoluble in water, a water soluble salt of the polyvalent metal is substituted, followed by a water soluble base, such as sodium or calcium hydroxide. Since it is necessary to have unreacted alkaline earth base present in the oil base fluid it is generally desirable to use the latter type of base as the alkalizer when producing polyvalent metal soaps from soluble polyvalent metal salts. Mixtures of soaps of different polyvalent metals may be used in the oil base fluid and are often desirable. Co-precipitation of the various soaps is permissible.

Among the satisfactory alkaline earth bases that may be used are calcium hydroxide, or calcium or magnesium oxides. The alkaline earth base must be present in an amount sufficient to raise the pH of the aqueous phase to above nine to maintain stability. A larger amount does no harm and is in fact desirable as it tends to suppress hydration and swelling of any shales or clays the aqueous phase may contact. If desired, a mixture of an alkaline earth salt, such as calcium chloride, and an alkali metal hydroxide, such as sodium hydroxide, may be substituted for the alkaline earth base.

Weight solids, such as ground limestone, iron oxide or barites, may be present in the oil base or oil emulsion fluid, but need not be present unless an increased specific gravity is desired. In fracturing fluids, it may be useful to incorporate sand or other material as a propping or bridging agent.

In the preparation of the oil base fluid or emulsion, according to the present invention, the ingredients may be added in any order, but the usual procedure is to add the two types of polyvalent metal soaps, or the two types of fatty acids, to the oil, followed by the alkaline earth base, the aqueous phase and finally any finely divided weight material. The fluid must be thoroughly agitated to assure dispersion of the soaps and emulsification of the internal aqueous phase. A high temperature is not necessary for dispersion, satisfactory fluids being produced at room temperature in most instances. An elevated temperature does, however, accelerate the make-up.

A series of tests were made to demonstrate the advantageous effect of the polyvalent metal soap of polymerized fatty acid on oil base and water-in-oil emulsion fluids containing polyvalent metal fatty acid soaps. All viscosity and gel strengths were measured at 120° F. on a Stormer viscosimeter and all fluid losses were determined at 190° F. on either the Baroid Low Pressure Wall Building Tester at 100 p.s.i. or on the Baroid High Pressure Wall Building Tester at 500 p.s.i. In all tests, except where otherwise noted, the polymerized fatty acid used was Emery 1022, which contained approximately 80% dimer, 17% trimer and 3% monomer acids.

*Example 1*

An oil base fluid was prepared in diesel fuel weighted with barites to 100 lb./cu. ft., and to this mixture was added 5 percent water, 0.35 percent ferric chloride, 3 percent lime and acids or soaps as shown in the following table:

| Acid or Soap | | Vis., cp. | Init. Gel, g. | 10' Gel, g. | 30' Fluid Loss, ml. | On standing 18 hours | |
|---|---|---|---|---|---|---|---|
| Percent | Type | | | | | Syneresis percent | Settling percent |
| 1.3 | distilled tall oil | 16 | 0 | 1 | 2.7 | 28 | 40 |
| 1.1 | distilled tall oil | 16 | 0 | 6 | 1.9 | 8 | 0 |
| 0.2 | Emery 1022 | | | | | | |
| 1.0 | Sodium Linoleate | 17 | trace | 1 | 2.2 | 30 | 35 |
| 0.8 | Sodium Linoleate | 18 | 0 | 6 | 1.8 | 11 | 0 |
| 0.2 | Emery 1022 | | | | | | |

In the above tests the fluid loss was determined at 500 p.s.i. and 190° F. The distilled tall oil contained 32% rosin acids and 61 percent fatty acids.

These results demonstrate the effect of the polymerized fatty acid soap derived from Emery 1022, in improving the thixotropy of the fluid, and in decreasing fluid loss, syneresis and settling, while at the same time having little or no effect on viscosity.

Example 2

A water-in-oil emulsion was prepared in diesel fuel containing 33 percent water and weighted to 72 lb./cu. ft. with barites. The fluid contained 3 percent lime and acids or soaps as shown in the following table:

| Acids | | Vis., cp. | Init. Gel, g. | 10' Gel, g. | 30' Fluid Loss ml. | Water in Filtrate, ml. |
|---|---|---|---|---|---|---|
| Percent | Type | | | | | |
| 2.0 | distilled tall oil | 21 | 1 | 7 | 9.0 | 2.4 |
| 1.75 0.25 | distilled tall oil Emery 1022 | 17 | 0 | 8 | 3.8 | 0 |
| 1.75 0.25 | distilled tall oil Emery 3019S | 18 | trace | 7 | 3.9 | 0 |
| 1.75 0.30 | distilled tall oil aluminum soap | 21 | trace | 7 | 4.2 | trace |
| 1.75 0.30 | distilled tall oil Zinc soap | 21 | 0 | 9 | 4.5 | trace |

The fluid loss in the above tests was determined at 100 p.s.i. and 190° F. Emery 1022 was essentially a dimer acid as previously described, and Emery 3019S contained more than 90% trimer polymerized acid. The distilled tall oil contained 32% rosin acids and 61% fatty acids. The aluminum and zinc soaps were derived from Emery 1022 polymerized fatty acids by reacting aluminum sulfate and zinc sulfate, respectively, with the potassium soaps of the polymerized acid, in aqueous solution, and filtering off the polyvalent metal soaps.

On standing eighteen hours no bottom settling occurred in any of the fluids, but the fluid not containing polymerized acid showed 15 percent top settling compared to 2 to 4% top settling where the dimer or trimer acid was present or where the aluminum or zinc soaps were present.

Here the calcium soaps from either dimer or trimer polymerized fatty acids reduced viscosity, initial gel strength and fluid loss, and greatly tightened the emulsion, as is evidenced by no water in the filtrate. Where zinc or aluminum polymerized acid soaps were used the improvement was almost as great. The polymerized acids actually reduced viscosity without increasing bottom settling and, remarkably, also reduced top settling or syneresis.

Example 3

An unweighted water-in-oil emulsion was prepared in diesel fuel containing 38 percent water, 3 percent lime, and acids as shown below:

| Acid | | Vis., cp. | Init. Gel | 10' Gel | 30' Fluid Loss | Water in Filtrate | 18 hr. Syneresis, percent |
|---|---|---|---|---|---|---|---|
| Percent | Type | | | | | | |
| 2.0 | distilled tall oil | 13 | ½ | 2 | 6.0 | 1.6 | 23 |
| 1.75 0.25 | distilled tall oil Emery 1022 | 11 | 0 | 4 | 3.5 | trace | 1 |

The fluid loss was determined at 100 p.s.i. and 190° F. Here again, the polymerized fatty acid soap reduced viscosity, initial gel strength, fluid loss, water in the filtrate, and syneresis, while at the same time increasing thixotropy.

Example 4

A water-in-oil emulsion was prepared from diesel fuel containing 48 percent water. It was weighted with barites to 68 lb./cu. ft. and treated with 0.5 percent 1-hydroxyethyl, 2 heptadecynal imidazoline, 1.5 percent lime and acids as shown in the following table:

| Acid | | Vis., cp. | Init. Gel, g. | 10' Gel, g. | 30' Fluid Loss at 500 p.s.i./ 190° F. | |
|---|---|---|---|---|---|---|
| Percent | Type | | | | Oil, ml. | Water, ml. |
| 0.45 | oleic acid | 21 | 1 | 2 | 3.3 | trace |
| 0.35 0.10 | oleic acid Emery 1022 | 23 | trace | 2 | 2.6 | 0 |
| 0.45 | myristic acid | 24 | ½ | 1 | 7.2 | trace |
| 0.35 0.10 | myristic acid Emery 1022 | 24 | trace | 1 | 4.6 | 0 |

In these tests the amine was added to reduce viscosity and initial gel strength and to tighten the loose emulsion that would normally occur with this large amount of water present. The polymerized acid soap further reduced the initial gel strength, tightened the emulsion, and appreciably reduced the fluid loss, while hardly affecting the viscosity. These results occurred in the presence of either the unsaturated or saturated fatty acid soaps.

Example 5

A water-in-oil emulsion fluid was prepared by adding to a diesel fuel containing 38 percent water, and weighted to 63 lb./cu. ft. with calcium carbonate, 2.3 percent of an aluminum soap prepared from distilled tall oil containing 61 percent fatty acids, 0.25 percent of an aluminum soap prepared from Emery 1022 polymerized fatty acids and 1 percent of lime. The resulting emulsion had at 120° F. a viscosity of 22 cp., an initial gel strength of zero and a 10 minute gel strength of 3 grams, while the 30 minute fluid loss at 190° F. and 100 p.s.i. was 2.9 ml. No water appeared in the filtrate despite the presence of 38 percent water in the emulsion.

Example 6

A water-in-oil emulsion fluid was prepared by adding to a diesel fuel containing 34 percent water, and weighted with barites to 72 lb./cu. ft., 2.5 percent of a manganese soap derived from distilled tall oil containing 61 percent fatty acids, 0.3 percent of an aluminum soap derived from Emery 1022 polymerized fatty acids and 2 percent lime. The resulting emulsion had at 120° F. a viscosity of 18 cp., an initial gel strength of zero and a 10 minute gel strength of 3 grams, while the 30 minute fluid loss at 190° F. and 100 p.s.i. was 2.4 ml. Again no water appeared in the filtrate.

It will be appreciated that the specific materials and percentages set forth may be varied to a certain extent without departing from the spirit and scope of the invention as set forth in the following claims.

What is claimed is:

1. An oil base drilling and fracturing fluid consisting essentially of: an oil base; 0.5 to 70 percent by weight of an aqueous phase containing sufficient alkaline earth base dissolved therein to raise the pH of the aqueous phase above 9; 0.2 to 5 percent by weight of a polyvalent metal soap of a monocarboxylic fatty acid containing at least 12 carbon atoms; and 0.05 to 1.0 percent by weight of a polyvalent metal polymerized soap of a polymerized monocarboxylic fatty acid, said polymerized acid containing at least two carboxyl groups and at least twenty-four carbon atoms.

2. An oil base drilling and fracturing fluid according to claim 1 and a polyvalent metal rosin soap in a minor proportion of the total soaps present.

3. An oil base drilling and fracturing fluid according to claim 1 in which the polyvalent metal polymerized soap is formed from the polymerization of an unsaturated fatty acid containing at least 12 carbon atoms.

4. An oil base drilling and fracturing fluid according to claim 1 containing alkali metal and alkaline earth metal salts dissolved in the aqueous phase.

5. An oil base drilling and fracturing fluid according to claim 1 and solids in suspension.

6. In a method of servicing a well during drilling, fracturing and completing operations, the step of circulating in said well a drilling and fracturing fluid as set forth in claim 1.

References Cited in the file of this patent

UNITED STATES PATENTS

| | | |
|---|---|---|
| 2,099,825 | Rolshausen et al. | Nov. 23, 1937 |
| 2,702,787 | Freeland | Feb. 22, 1955 |
| 2,754,265 | Hoeppel | July 10, 1956 |
| 2,779,735 | Brown et al. | Jan. 29, 1957 |
| 2,793,188 | Swain et al. | May 21, 1957 |
| 2,793,189 | Schussler | May 21, 1957 |
| 2,793,996 | Lummus | May 28, 1957 |
| 2,862,881 | Reddie | Dec. 2, 1958 |